United States Patent
Braverman et al.

(10) Patent No.: US 10,467,045 B1
(45) Date of Patent: Nov. 5, 2019

(54) ON-DEMAND ISOLATED EXECUTION OF SPECIFIC TASKS

(71) Applicant: Binaris Inc, Los Gatos, CA (US)

(72) Inventors: Avner Braverman, Tel-Aviv (IL); Michael Adda, Dimona (IL)

(73) Assignee: Binaris Inc, Sunnyvale, CA (US)

( * ) Notice: Subject to any disclaimer, the term of this patent is extended or adjusted under 35 U.S.C. 154(b) by 45 days.

(21) Appl. No.: 15/643,040

(22) Filed: Jul. 6, 2017

Related U.S. Application Data (60) Provisional application No. 62/359,330, filed on Jul. 7, 2016.

(51) Int. Cl.
  *G06F 9/48* (2006.01)
  *G06F 9/52* (2006.01)
  *G06F 9/50* (2006.01)
  *G06F 9/30* (2018.01)

(52) U.S. Cl.
  CPC .......... *G06F 9/4806* (2013.01); *G06F 9/3017* (2013.01); *G06F 9/5011* (2013.01); *G06F 9/5016* (2013.01); *G06F 9/5022* (2013.01); *G06F 9/52* (2013.01)

(58) Field of Classification Search
  None
  See application file for complete search history.

(56) References Cited

U.S. PATENT DOCUMENTS

| | | | |
|---|---|---|---|
| 5,784,594 A | 7/1998 | Beatty | |
| 8,090,797 B2 | 1/2012 | Chinta et al. | |
| 8,612,580 B2 | 12/2013 | Gandhi et al. | |
| 9,177,237 B2 | 11/2015 | Austin et al. | |
| 9,720,732 B1 * | 8/2017 | Shih | G06F 9/4887 |
| 10,013,550 B1 | 7/2018 | Ahuja et al. | |
| 10,025,924 B1 | 7/2018 | Vagin et al. | |
| 10,055,200 B1 | 8/2018 | Russell et al. | |
| 2004/0103194 A1 | 5/2004 | Islam et al. | |
| 2006/0190482 A1 | 8/2006 | Kishan et al. | |
| 2007/0083501 A1 | 4/2007 | Pedersen et al. | |
| 2007/0192329 A1 | 8/2007 | Croft et al. | |

(Continued)

OTHER PUBLICATIONS

Newhouse, T., & Pasquale, J. "Java active extensions: scalable middleware for performance-isolated remote execution". Computer communications Journal, 28(14), 1680-1691, 2005 (Year: 2005).

(Continued)

*Primary Examiner* — Wynuel S Aquino
(74) *Attorney, Agent, or Firm* — Active Knowledge Ltd.

(57) ABSTRACT

System and methods for on-demand isolated execution of specific tasks. A system receives, via a communication interface, requests to execute tasks. The system reacts to each of the requests by allocating, on-demand and per the request received, a unique sub-set of physical computational resources, so as to result in several such unique sub-sets of resources. The system executes, per each of the tasks, the respective commands of the task, by converting the respective commands of the task into executable instructions and running the executable instructions. The respective commands of each of the tasks are converted so as to cause the resulting executable instruction to refrain from accessing other unique sub-sets that were not allocated to the task, thereby facilitating said on-demand isolated execution of each of the tasks.

20 Claims, 4 Drawing Sheets

(56) References Cited

U.S. PATENT DOCUMENTS

| | | | |
|---|---|---|---|
| 2008/0072230 A1* | 3/2008 | Jackson | G06F 9/4843 718/104 |
| 2009/0199201 A1* | 8/2009 | Arimilli | G06F 9/50 718/106 |
| 2009/0328047 A1* | 12/2009 | Li | G06F 9/5033 718/102 |
| 2010/0318665 A1 | 12/2010 | Demmer et al. | |
| 2011/0047613 A1 | 2/2011 | Walsh | |
| 2012/0110584 A1* | 5/2012 | Chaudhry | G06F 9/5027 718/102 |
| 2012/0131591 A1* | 5/2012 | Moorthi | G06Q 10/06 718/104 |
| 2013/0067476 A1* | 3/2013 | Rosenberg | G06F 9/4843 718/100 |
| 2013/0346480 A1 | 12/2013 | Certain et al. | |
| 2014/0007128 A1* | 1/2014 | Schroth | G06F 9/5044 718/104 |
| 2014/0074641 A1* | 3/2014 | Wang | G06F 9/50 705/26.3 |
| 2014/0189683 A1* | 7/2014 | Bing | G06F 9/45533 718/1 |
| 2014/0304399 A1 | 10/2014 | Chaudhary et al. | |
| 2015/0149273 A1* | 5/2015 | Schweier | G06Q 30/0244 705/14.43 |
| 2015/0254455 A1 | 9/2015 | Sandhu et al. | |
| 2015/0312115 A1 | 10/2015 | Clubb et al. | |
| 2015/0350311 A1 | 12/2015 | Arai et al. | |
| 2016/0110224 A1* | 4/2016 | Cao | G06F 11/3003 718/104 |
| 2016/0337426 A1 | 11/2016 | Shribman et al. | |
| 2017/0006059 A1 | 1/2017 | Meulenhoff et al. | |
| 2017/0192802 A1 | 7/2017 | Sampathkumar et al. | |
| 2018/0136959 A1 | 5/2018 | Vyas et al. | |
| 2018/0150325 A1 | 5/2018 | Kuo et al. | |
| 2018/0321976 A1 | 11/2018 | Chen et al. | |
| 2018/0336113 A1 | 11/2018 | Asawa et al. | |
| 2018/0349168 A1 | 12/2018 | Ahmed | |

OTHER PUBLICATIONS

Ravid Brown; "Running Containers on Bare Metal vs. VMs: Performance and Benefits"; strattoscale.com blog page; Jan. 11, 2017 (Year: 2017).

Shetty et al.; "An Empirical Performance Evaluation of Docker Container, Openstack Virtual Machine and Bare Metal Server"; Indonesian Journal of Electrical Engineering and Computer Science, vol. 7, No. 1; Jul. 1, 2017 (Year: 2017).

"Amazon Serverless computing or Google Function as a Service (FaaS) vs Microservices and Container Technologies"; AgileStacks. com blog page; Sep. 12, 2016 (Year: 2016).

* cited by examiner

ON-DEMAND ISOLATED EXECUTION OF SPECIFIC TASKS

CROSS REFERENCE TO RELATED APPLICATIONS

The present application is related to and claims priority under 35 USC § 120 to U.S. Provisional Application No. 62/359,330, filed on Jul. 7, 2016, which is hereby incorporated by reference.

BACKGROUND

Computer systems, such as servers, mainframes, or even personal computers, are often required to allocate separate physical compute/storage resources to different software environments all possibly running under one operating system. Such software environments use the separate physical resources to run in isolation, such that each software environment does not interfere with any of the other software environments or the physical resources thereof. These computer systems often use virtualization methods to achieve said isolation, like in the case of Linux Containers, which are an operating-system-level method for running several Linux software environments in isolation. Each software environment is created and allocated with separate physical resources so as to be maintained for long periods of time, perhaps even days, and so as to possibly accommodate many software processes and programs all running under each of these environments. Creating each of such isolated environments requires a substantial system overhead, is time consuming, and is susceptible to faults which accumulate over time. As a result of the difficulties mentioned above, it is not currently practical to maintain a very large number of such isolated environments all running in parallel. Modern systems, such data centers, are required to handle emerging execution architectures, such as the microservice architecture, which is a method of developing software applications as a collection of small and modular services, in which each of the services achieves a specific task, and can communicate with other services to achieve other tasks. Current isolation techniques are incapable of achieving isolation at a very large scale, and are certainly incapable of achieving isolation at the service/task level.

SUMMARY

One embodiment is a system (FIG. 1) operative to facilitate on-demand isolated execution of a plurality of tasks. The system includes: (i) a set of physical computational resources, (ii) at least one compute element belonging to at least one central-processing-unit, and (iii) a communication interface. The system is configured to receive, via the communication interface, a plurality of requests to execute respectively a plurality of tasks, in which each of the plurality of tasks comprises a plurality of commands. The system is further configured to react, to each the requests received, by allocating on-demand and per the request received, a unique sub-set of the physical computational resources, so that a plurality of the unique sub-sets coexists at least temporarily in conjunction with the plurality of tasks respectively. The system is further configured to execute, per each of the plurality of tasks, in a designated one of the compute elements, the respective commands of the task, by converting the respective commands of the task into executable instructions and running the executable instructions, in which the respective commands of the task are converted so as to cause the respective executable instruction to refrain from accessing other unique sub-sets that were not allocated to the task, thereby facilitating said on-demand isolated execution of each of the plurality of tasks.

One embodiment is a method (FIG. 2) for on-demand isolated execution of specific tasks, comprising: receiving, via a communication interface, in a computing platform, a request to execute a specific task, in which the specific task is expressed as a first code segment comprising a plurality of commands; reacting, by the computing platform, to the request received, by allocating on-demand and per the request received, a sub-set of physical computational resources within the computing platform, in which said sub-set allocated is operative to facilitate successful execution of the specific task; and executing, in the computing platform, the specific task, by (i) converting each of the commands into executable instructions and (ii) running the executable instructions, in which the commands are converted so as to cause the executable instructions to utilize resources within the allocated sub-set of physical computational resources, while avoiding utilization of other resources that were not allocated for the specific task, thereby facilitating said on-demand isolated execution of the specific task.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings.

DETAILED DESCRIPTION

Figure 1:
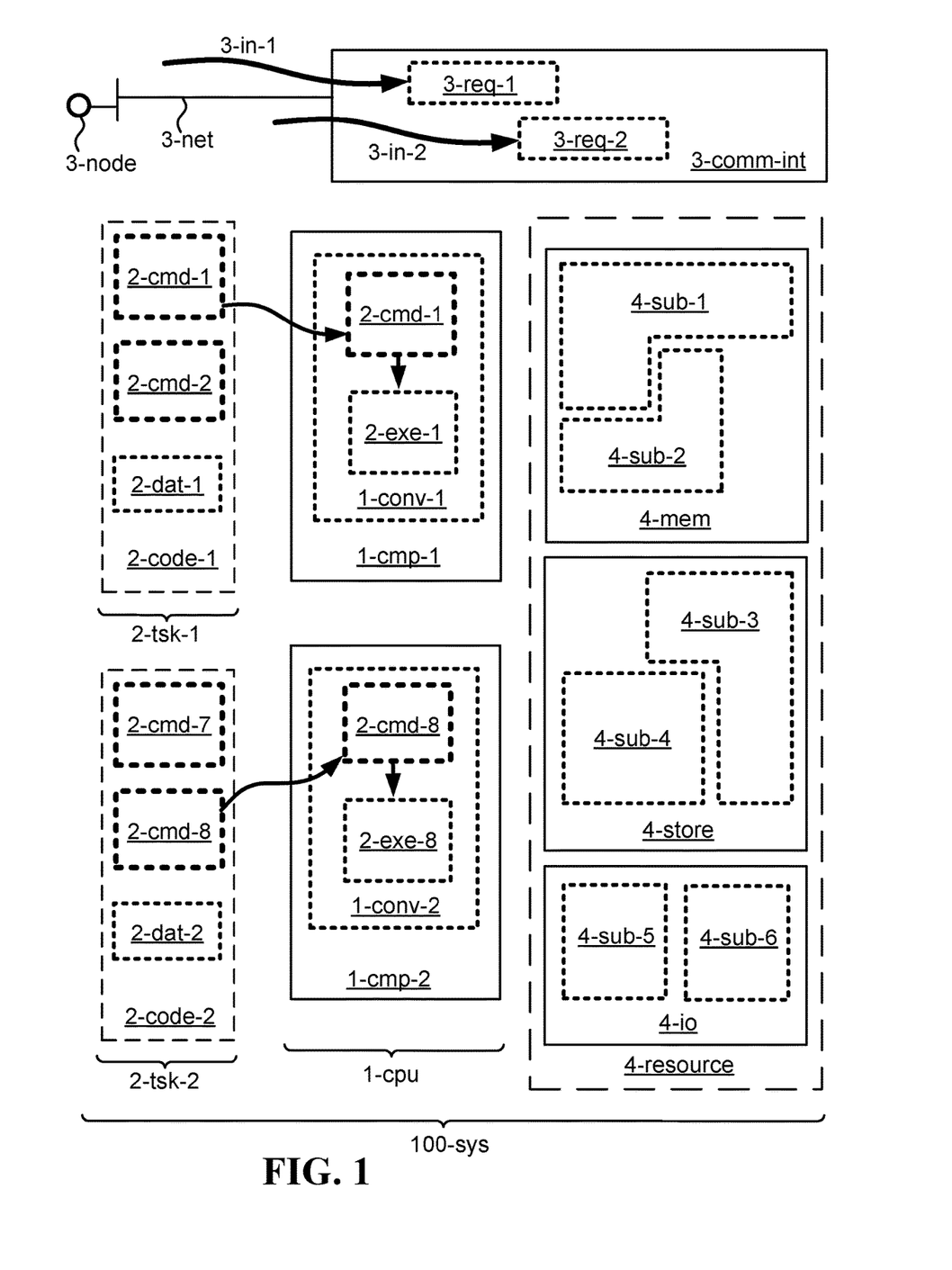
FIG. 1 illustrates one embodiment of a system operative to facilitate on-demand isolated execution of a plurality of tasks.

FIG. 1 illustrates one embodiment of a system 100-sys operative to facilitate on-demand isolated execution of a plurality of tasks. System 100-sys may be a server or a cluster of servers, a mainframe computer system, a supercomputer, a personal computer, or even a graphical processing system. System 100-sys includes a set of physical computational resources 4-resource, at least one compute element 1-cmp-1, 1-cmp-2 belonging to at least one data processing unit 1-cpu, and a communication interface 3-comm-int. System 100-sys receives 3-in-1, 3-in-2, via the communication interface 3-comm-int, a plurality of requests 3-req-1, 3-req-2 to execute respectively a plurality of tasks 2-tsk-1, 2-tsk-2. The requests 3-req-1, 3-req-2 could be in the form of a remote procedure call (RPC), which is a protocol allowing one entity to request, possibly via a network, a service from (or the execution of a task by) another entity often located in another system, or the requests could be in another form such as a signal, an interrupt, or a message of some sort. The communication interface 3-comm-int conveying the requests to the system may be a network interface, a communication port, a bus of some sort, or any mechanism through which the system is made aware of the requests. The requests may be generated by a node 3-node of some sort, either external or internal to the system 100-sys. The node 3-node may be a device requesting a service, such a mobile phone, a component in another system requesting system 100-sys to perform a certain task, or even an internal component or process inside system 100-sys requesting a service. Each of the tasks 2-tsk-1, 2-tsk-2 could be a certain service needed by the requestor, a function or a subroutine call made by the requestor, or any other required process which results in a specific outcome, a specific data, or a certain conclusion needed by the requestor at the time of making the request. In many cases, the requestor 3-node is making the request in anticipation of receiving some kind of an answer or result from system 100-sys within a certain period of time, and in that case the requesting process is synchronous in the sense that the request triggers a task within the system, which is turns triggers a response process. The entire request-process-respond procedure may be required to be of a real-time nature, and in that case there would be a certain latency tolerated by the requestor, in which this latency could be expected to be as low as 1 (one) second, 100 (one hundred) milliseconds, or even 10 (ten) milliseconds or lower. In other cases the request is not associated with a synchronous respond procedure, and may be logged in the system until a certain activation event occurs.

Upon receiving each of the requests 3-req-1, 3-req-2, the system reacts to the specific request (e.g., to request 3-req-1 associated with task 2-tsk-1) by allocating on-demand a unique sub-set of the physical computational resources 4-resource for usage by the associated task. For example, the sub-set 4-sub-1, 4-sub-3, 4-sub-5 is now allocated specifically for performing task 2-tsk-1 as a response to request 3-req-1. The allocation of the sub-set 4-sub-1, 4-sub-3, 4-sub-5 is made by a demand of the specific request 3-req-1 (on-demand), in which said demand may be implicit by the mere existence of the specific request, or it may be explicit via a field or a data element within the specific request. The physical computational resources 4-resource may include memory resources 4-mem, storage resources 4-store, or other resources such as input-output (I/O) resources 4-io. The sub-set 4-sub-1, 4-sub-3, 4-sub-5 allocated for 2-tsk-1 is unique, and does not overlap with other sub-sets 4-sub-2, 4-sub-4, 4-sub-6 that may be allocated to other tasks 2-tsk-2 as a response to other requests 3-req-2.

When a sub-set is allocated, e.g., sub-set 4-sub-1, 4-sub-3, 4-sub-5, the system will then proceed with execution of the respective task 2-tsk-1. However, execution of the respective task is not done in an ordinary fashion, but rather using a particular execution process designed to make sure task 2-tsk-1 is executed utilizing resources within sub-set 4-sub-1, 4-sub-3, 4-sub-5 juts allocated, and without utilizing, accessing, or using resources within the physical computational resources 4-resource that were not allocated to 2-tsk-1, such as 4-sub-2, 4-sub-4, 4-sub-6. The motivation for using such a particular execution process may be to make sure 2-tsk-1 does not interfere, alter, or otherwise affect, in any way, the execution of other tasks 2-tsk-2 and resources associated therewith, and to make sure that such interferences are not projected, intentionally or unintentionally, by the other tasks 2-tsk-2 on the resources allocated to 2-tsk-1 or on 2-tsk-1 itself. The result is an isolated execution of each of the tasks.

The particular execution process which results in isolated execution of the tasks 2-tsk-1, 2-tsk-2 may be achieved by performing a careful conversion of code associated with each of the tasks. 2-tsk-1 is associated with a certain code segment 2-code-1 comprising commands 2-cmd-1, 2-cmd-2 and other associated elements such as data elements 2-dat-1, and 2-tsk-2 is associated with a certain other code segment 2-code-2 comprising commands 2-cmd-7, 2-cmd-8 and other associated elements 2-dat-2. When a code, such as 2-code-1, is converted 1-conv-1 to executable instructions 2-exe-1, it is converted so as to cause the resulting executable instructions 2-exe-1 to contain access parameters that are solely within the span of sub-set 4-sub-1, 4-sub-3, 4-sub-5 allocated to the associated task 2-tsk-1. For example, when memory write command 2-cmd-1 is converted 1-conv-1, the resulting executable instruction/s 2-exe-1 will contain an executable memory write instruction having an address field that is guaranteed by the conversion process to fall within the address span of 4-sub-1, in which 4-sub-1 is the part of memory 4-mem that was specifically allocated to 2-tsk-1. Similarly, when storage access command 2-cmd-2 is converted 1-conv-1, the resulting executable instruction/s will contain an executable storage access instruction/s having access field/s that are guaranteed by the conversion process to be associated only with 4-sub-3, in which 4-sub-3 is the part of storage 4-store that was specifically allocated to 2-tsk-1. In a similar fashion, when 2-code-2 is converted 1-conv-2 to executable instruction/s 2-exe-8, the resulting access/address fields are guaranteed by 1-conv-2 to be contained within the span of the resources sub-set 4-sub-2, 4-sub-4, 4-sub-6 allocated to 2-tsk-2. Now, when the system executes 2-exe-1 for task 2-tsk-1, and 2-exe-8 for task 2-tsk-2, it is guaranteed that 2-exe-1 operates only within the resource limits of 4-sub-1, 4-sub-3, 4-sub-5, and that 2-exe-8 operates only within the resource limits of sub-set 4-sub-2, 4-sub-4, 4-sub-6, which results in task 2-tsk-1 being isolated from task 2-tsk-2 and vice versa.

The conversions 1-conv-1, 1-conv-2 may be done using a compilation process—i.e., all of the commands 2-cmd-1, 2-cmd-2 converted together as a whole, and all of the commands 2-cmd-7, 2-cmd-8 converted together as a whole, or the conversions may be done using an interpretation process—i.e., the commands 2-cmd-1, 2-cmd-2 are converted one-by-one or just-in-time for execution.

The entire process of receiving one of the requests, allocating a sub-set of resources to the respective task, converting-and-executing the task, and responding to the requestor, could be made synchronous and on-the-fly, so as to create an event flow that can facilitate real-time and on-demand isolation for each of the tasks, and that is perceived by the requestor as an immediate response. When finishing execution of each of the tasks, the system may de-allocated/release the respective sub-set of resources for other tasks or purposes. The result may be that at the time the requestor gets its response, the sub-set of resources that has served the requestor is already allocated by the system to another task; this flow of events demonstrates the real-time potential of the system, which could facilitate massive scaling and the serving of a very large number of requests/isolated execution of tasks concurrently. The allocation and de-allocation of resources for a task per a request may be an integral part of such flow of events and may therefore contribute significantly to the efficiency and scalability of the real-time isolation mechanism just described.

Each of the tasks 2-tsk-1, 2-tsk-2 could be a stored procedure—i.e., already present within the system 100-sys at the time of receiving the respective request, or it could be delivered to the system in conjunction with the respective requests itself. In addition, a single task code could be reused in many instances by many respective requests, but in which each instance is still allocated with a unique sub-set of the resources per the respective request.

A certain non-limiting scenario is now presented by way of example only. A Smartphone 3-node may need to use an online machine-learning prediction model to analyze locally gathered data, in which the system 100-sys has the online machine-learning prediction model embedded in one of the tasks. The Smartphone sends a request to the system via a communication network 3-net, in which the request includes said locally gathered data and a reference to the relevant task. The system receives the request, and immediately allocates unique memory and storage space for serving the request. The system then converts the relevant task to executable instructions configured to work in conjunction with said unique memory and storage spaces just allocated, and executes the executable instructions to produce a prediction for the Smartphone. The prediction is then sent to the Smartphone via the communication network, while the unique memory and storage spaces are quickly released, and optionally already allocated to a completely different task.

One embodiment is a system 100-sys operative to facilitate on-demand isolated execution of a plurality of tasks. The system includes: (i) a set of physical computational resources 4-resource, (ii) at least one compute element 1-cmp-1, 1-cmp-2 belonging to at least one central-processing-unit 1-cpu, and (iii) a communication interface 3-comm-int.

In one embodiment, the system 100-sys is configured to receive 3-in-1, 3-in-2, via the communication interface 3-comm-int, a plurality of requests 3-req-1, 3-req-2 to execute respectively a plurality of tasks 2-tsk-1, 2-tsk-2, in which each of the plurality of tasks comprises a plurality of commands (e.g., 2-tsk-1 comprises the commands 2-cmd-1, 2-cmd-2, and 2-tsk-2 comprises the commands 2-cmd-7, 2-cmd-8).

In one embodiment, the system 100-sys is further configured to react, to each the requests 3-req-1, 3-req-2 received, by allocating on-demand and per the request received, a unique sub-set of the physical computational resources 4-resource, so that a plurality of the unique sub-sets coexists at least temporarily in conjunction with the plurality of tasks respectively (e.g., sub-set 4-sub-1, 4-sub-3, 4-sub-5 is allocated on-demand to task 2-tsk-1 as a direct and immediate reaction to receiving 3-req-1, and sub-set 4-sub-2, 4-sub-4, 4-sub-6 is allocated on-demand to task 2-tsk-2 as a direct and immediate reaction to receiving 3-req-2).

In one embodiment, the system 100-sys is further configured to execute, per each of the plurality of tasks 2-tsk-1, 2-tsk-2, in a designated one of the compute elements 1-cmp-1, 1-cmp-2, the respective commands of the task (e.g., commands 2-cmd-1, 2-cmd-2 of task 2-tsk-1 are executed in 1-cmp-1, and commands 2-cmd-7, 2-cmd-7 of task 2-tsk-2 are executed in 1-cmp-2), by converting 1-conv-1, 1-conv-2 the respective commands of the task into executable instructions and running the executable instructions (e.g., 2-cmd-1 is specifically shown to be converted into 2-exe-1, but command 2-cmd-2 is also converted either separately or jointly, and 2-cmd-8 is specifically shown to be converted into 2-exe-8, but command 2-cmd-7 is also converted either separately or jointly), in which the respective commands of the task are converted so as to cause the respective executable instruction to not access other unique sub-sets that were not allocated to the task, thereby facilitating said on-demand isolated execution of each of the plurality of tasks (e.g., 2-exe-1 of task 2-tsk-1 is generated so as to not access sub-set 4-sub-2, 4-sub-4, 4-sub-6 that was allocated to task 2-tsk-2, and 2-exe-8 of task 2-tsk-2 is generated so as to not access sub-set 4-sub-1, 4-sub-3, 4-sub-5 that was allocated to task 2-tsk-1).

In one embodiment, the system 100-sys is further configured to terminate the on-demand isolated execution of each of the tasks 2-tsk-1, 2-tsk-2 immediately upon a particular event associated with the task, thereby releasing immediately the respective unique sub-set of the task (e.g., releasing 4-sub-1, 4-sub-3, 4-sub-5 upon termination of 2-tsk-1, and releasing 4-sub-2, 4-sub-4, 4-sub-6 upon termination of 2-tsk-2), thereby assuring that the respective unique sub-set of each of the tasks exist only for a duration in which the task is being executed and being terminated. In one embodiment, said duration of existence, on average, is between 1 (one) milliseconds and one (1) second, an average time for performing said allocation for each the unique sub-sets is less than $1/10$ (one tenth) of said duration, and an average time for performing said releasing for each the unique sub-sets is less than $1/10$ (one tenth) of said duration. In one embodiment, said plurality of requests 3-req-1, 3-req-2 are received as a stream of incoming requests, and said duration and average times allow, per each of the compute elements 1-cmp-1, 1-cmp-2, to sustain, on average, a rate of executing of at least one of the tasks 2-tsk-1, 2-tsk-2 per second, and up to a maximum rate of executing 1000 (one thousand) of the tasks per second. In one embodiment, each of the requests 3-req-1, 3-req-2 is a remote-procedure-call (RPC).

In one embodiment, the system 100-sys is a computing platform that communicates with remote nodes 3-node via said communication interface 3-comm-int and a network 3-net, the communication interface is a physical network adapter connected to the network, and the requests 3-req-1, 3-req-2 are received in the system 100-sys, from the remote nodes 3-node, via the network 3-net.

In one embodiment, the communication interface is a logical interface, and at least some f the requests are generated from within the system and possibly by some of the tasks themselves.

in one embodiment, at least one of the requests 3-req-1, 3-req-2 is a remote-procedure-call (RPC).

In one embodiment, at least one of the tasks 2-tsk-1, 2-tsk-2 is configured to calculate at least one value, and to return the value as a respond to the respective remote node 3-node upon said termination of the task.

In one embodiment, at least one of the tasks 2-tsk-1, 2-tsk-2 is configured to receive a value via the respective request 3-req-1, 3-req-2, and to use this value in conjunction with the respective execution of the respective commands.

In one embodiment, at least one of the requests 3-req-1, 3-req-2 is an internal system request associated with a system event that requires handling by one of the tasks 2-tsk-1, 2-tsk-2.

In one embodiment, the set of physical computational resources 4-resource comprises at least one of: (i) physical memory 4-mem such as a random-access-memory (RAM) or a flash memory, in which each of the unique sub-sets 4-sub-1, 4-sub-2 is a unique subset of the physical memory, (ii) physical storage 4-store such as magnetic hard disks or flash disks, in which each of the unique sub-sets 4-sub-3, 4-sub-4 comprises a unique subset of the physical storage, and (iii) input-output (IO) channels 4-io, in which each of the unique sub-sets 4-sub-5, 4-sub-6 comprises a unique subset of the IO channels.

In one embodiment, the system 100-sys is further configured to limit, per each of the tasks 2-tsk-1, 2-tsk-2 being executed, an extent to which the task is utilizing other system resource, in which said other system resource comprise at least one of: (i) the respective computer element clock cycles, (ii) communication bandwidth, and (iii) power dissipation.

In one embodiment, the set of physical computational resources 4-resource is a physical memory 4-mem such as a random-access-memory (RAM) or a flash memory, in which each of the unique the sub-sets 4-sub-1, 4-sub-2 is a memory space of less than 1 mbyte (one megabyte), thereby allowing for at least 1,000 (one thousand) of the tasks to be concurrently active per 1 Gbyte (one gigabyte) of the physical memory.

Figure 2:
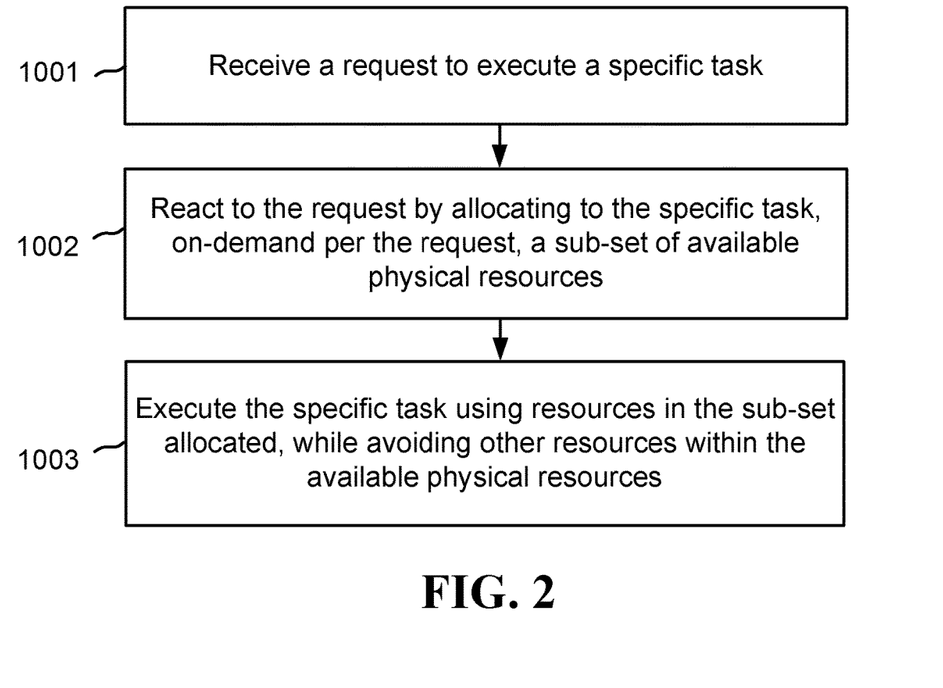
FIG. 2 illustrates one embodiment of a method for on-demand isolated execution of specific tasks.

FIG. 2 illustrates one embodiment of a method for on-demand isolated execution of specific tasks. The method comprises: In step 1001, receiving 3-in-1, via a communication interface 3-comm-int, in a computing platform 100-sys, a request 3-req-1 to execute a specific task 2-tsk-1, in which the specific task is expressed as a first code segment 2-code-1 comprising a plurality of commands 2-cmd-1, 2-cmd-2. In step 1002, reacting, by the computing platform 100-sys, to the request 3-req-1 received, by allocating on-demand and per the request received, a sub-set 4-sub-1, 4-sub-3, 4-sub-5 of physical computational resources 4-resource within the computing platform 100-sys, in which said sub-set allocated is operative to facilitate successful execution of the specific task 2-tsk-1. In step 1003, executing, in the computing platform 100-sys, the specific task 2-tsk-1, by (i) converting each of the commands 2-cmd-1, 2-cmd-2 into executable instructions (e.g., 2-cmd-1 is converted into executable instructions 2-exe-1) and (ii) running the executable instructions, in which the commands are converted 1-conv-1 so as to cause the executable instructions to utilize resources within the allocated sub-set 4-sub-1, 4-sub-3, 4-sub-5 of physical computational resources, while avoiding utilization of other resources 4-sub-2, 4-sub-4, 4-sub-6 that were not allocated for the specific task 2-tsk-1, thereby facilitating said on-demand isolated execution of the specific task 2-tsk-1.

In one embodiment, said specific task 2-tsk-1 has a starting point (e.g., 2-cmd-1) and an ending point (e.g., 2-cmd-2), and the method further comprises: initiating said execution in conjunction with said starting point; continuing said execution till the ending point; terminating said execution immediately after reaching the ending point; and releasing the sub-set 4-sub-1, 4-sub-3, 4-sub-5 of physical computational resources immediately after said termination and regardless of any state set by the specific task 2-tsk-1 in conjunction with the sub-set 4-sub-1, 4-sub-3, 4-sub-5 of physical computational resources.

In one embodiment, a transition between said reception 3-in-1 and said execution takes less than 10 (ten) millisecond as a combined result of said conversion 1-conv-1 being an interpretation process and said allocation on-demand.

In one embodiment, said transition together with said execution till the ending point and including said releasing takes less than 100 (one hundred) milliseconds as a combined result of said interpretation process 1-conv-1, said allocation on-demand, and said specific task 1-tsk-1 having said starting point and ending point.

In one embodiment, the physical computational resources 4-resource comprise physical memory 4-mem, in which the sub-set 4-sub-1 of the physical computational resources comprise a sub-set of the physical memory.

In one embodiment, the code segment 2-code-1 further comprises data sets 2-dat-1, and the method further comprising: setting, using the data sets, in conjunction with said execution, memory values in conjunction with the sub-set 4-sub-1 of the physical memory 4-mem.

In one embodiment, the method further comprises: terminating the task 2-tsk-1 when the task ends; and then immediately releasing the sub-set 4-sub-1 of the physical memory 4-mem for usage by other tasks, and regardless of said setting of memory values which are now no longer relevant upon said termination.

In one embodiment, the method further comprises: terminating said on-demand isolated execution immediately upon a particular event associated with the specific task 2-tsk-1, thereby releasing immediately the sub-set 4-sub-1, 4-sub-3, 4-sub-5 of physical computational resources 4-resource for other tasks.

In one embodiment, said particular event is selected from a group consisting of: (i) an ending or completion of the specific task 2-tsk-1, (ii) a timeout which limits the execution time of the specific task 2-tsk-1, (iii) a fault made by the specific task 2-tsk-1, and (iv) a supervision decision, by the computing platform 100-sys, to terminate the specific task 2-tsk-1.

In one embodiment, the conversion 1-conv-1 is an interpretation process, in which each of the commands is converted and executed separately from the other commands (e.g., 2-cmd-1 is converted and executed separately from 2-cmd-2).

In one embodiment, the conversion 1-conv-1 is a compilation process.

In one embodiment, the conversion 1-conv-1 is a binary translation process.

In one embodiment, said causing of the executable instructions 2-exe-1 to utilize resources within the allocated sub-set 4-sub-1, 4-sub-3, 4-sub-5 is facilitated by generating, in conjunction with said conversion 1-conv-1 and prior to run time, specific access addresses to be utilized by the executable instructions, in which said specific access addresses are guaranteed, by the computing platform, to be contained within a set of addresses associated with the allocated sub-set.

In one embodiment, said causing of the executable instructions 2-exe-1 to utilize resources within the allocated sub-set 4-sub-1, 4-sub-3, 4-sub-5 is facilitated by generating, in conjunction with said conversion 1-conv-1 and prior to run time, specific validation instructions within the executable instructions, in which said specific validation instructions are operative, during run time, to validate specific access addresses utilized by the executable instructions, in which said validation guarantees that the specific access addresses are contained within a set of addresses associated with the allocated sub-set.

In one embodiment, said specific task 2-tsk-1 has a starting point (e.g., 2-cmd-1) and an ending point (e.g., 2-cmd-2), and the method further comprises: initiating said execution in conjunction with said starting point; continuing said execution till the ending point; terminating said execution immediately after reaching the ending point; and preserving the sub-set 4-sub-1, 4-sub-3, 4-sub-5 of physical computational resources after said termination, thereby allowing re-use of the sub-set for consequent tasks that are identified to be associated with a group of tasks to which the specific task belongs.

One embodiment is a unified client-server system for executing services. The services executed by the unified client-server system may be microservices associated with a microservice architecture, or other services in which a first entity sends a request to another entity to execute a certain service needed by the first entity. The system may decide which services to execute on which of a plurality of different kinds of devices located in a variety of places. The decision may affect service request latency, network bandwidth, and power consumption. The unified client-server system may be abstracted via a certain interface, such that the actual execution place of the services is controlled by the system and not necessarily by the requesting entities.

Figure 3:
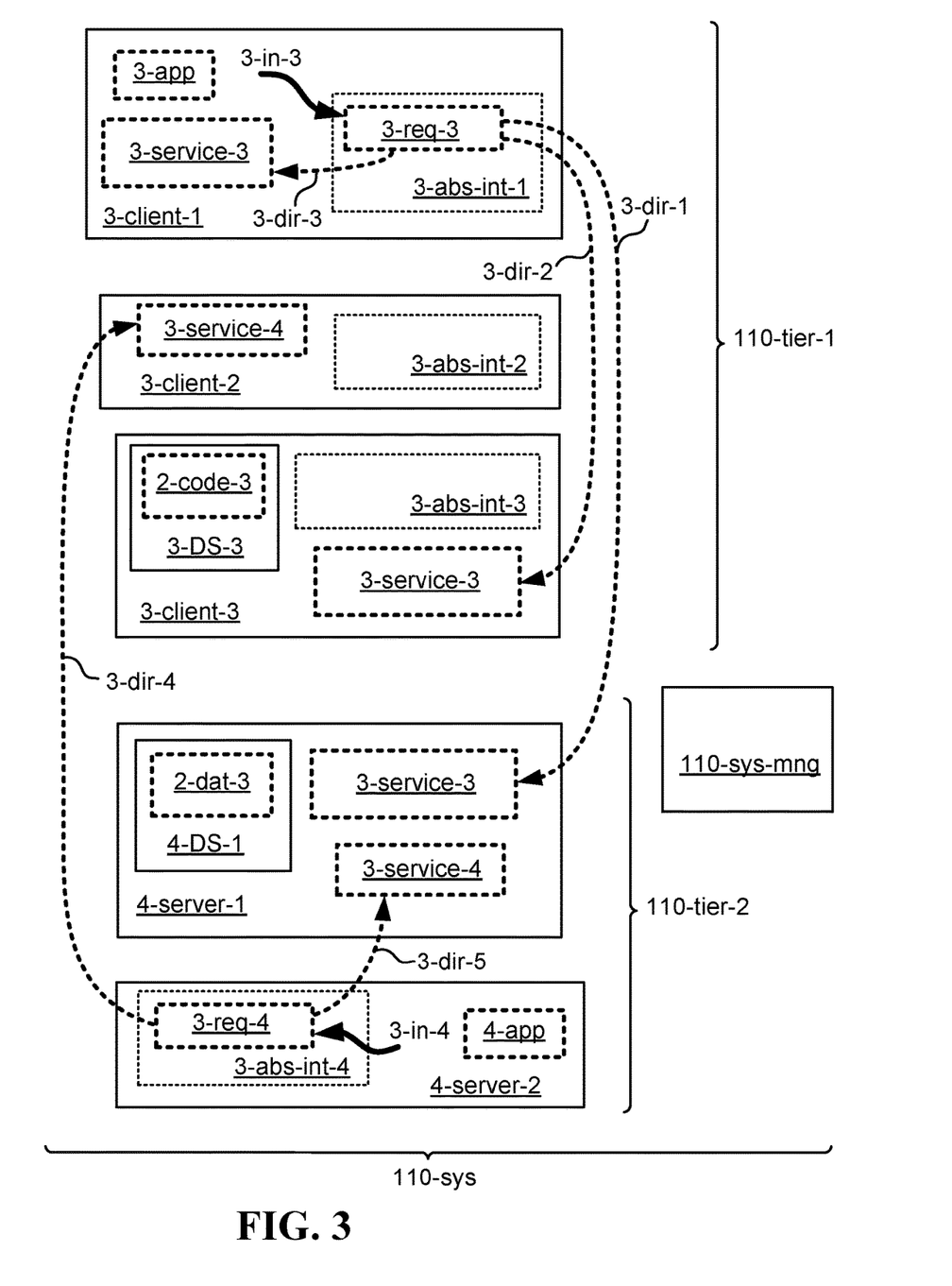
FIG. 3 illustrates one embodiment of a system operative to migrate execution of services across multiple tiers.

FIG. 3 illustrates one embodiment of a system 110-sys operative to migrate execution of services, such as mictoservices in a microservice architecture, across multiple tiers. A first tier 110-tier-1 of client devices 3-client-1, 3-client-2, 3-client-3 is shown, in which each of the client devices may be a mobile wireless device such as a smartphone or a tablet, or it could be a personal computer or a server computer, an internet-of-things (IoT) device such as a home appliance, or even a component of an autonomous car. A second tier 110-tier-2 of server devices 4-server-1, 4-server-2 is shown, in which at least some of the server devices may be a server located in an office, a cluster of servers in a datacenter, a component of cloud computing, a hardware-specific server such as a digital signal processing (DSP) server, a graphical processing unit (GPU) server, or even a field-programmable gate array (FPGA) server, or any device or a cluster of devices tuned or dedicated for serving a large plurality of users/clients simultaneously. Some of the devices may be both a client device and a server device, in the sense of being able to both originate requests for services and serve requests for services.

A client device, such as a smartphone (e.g., 3-client-1), may run an application 3-app of some sort, in which the application may use a request mechanism, such as a remote procedure call (RPC) protocol, for sending 3-in-3 a request 3-req-3 to execute a task or a service 3-service-3, such as a microservice or a numerical task, on behalf of the client device 3-client-1. The request 3-req-3 to execute the task/service 3-service-3 would normally be sent directly to a known target device for execution, but instead it is directed to an abstraction interface 3-abs-int-1 associated with the client device making the request. The abstraction interface 3-abs-int-1 is shown to be located within the client device making the request, but it could also be located outside the client device. The abstraction interface 3-abs-int-1 or other abstraction interfaces such as 3-abs-int-2, 3-abs-int-3, in conjunction with a management component 110-sys-mng that may be located outside or inside the client device or perhaps even distributed across several locations, makes a decision/selection as to where the service requested 3-service-3 should be executed. The request 3-req-3, or a derivative of the request, is then sent/directed (one of 3-dir-1, 3-dir-2, or 3-dir-3) to the target device selected, the target device receives the request, and executes the service as requested. After execution of the service, the target device may then return a result or response of some sort to the requesting client device.

The service requested 3-service-3 is performed by executing an associated code segment such as 2-code-3. The code segment may be located in a data store such as 3-DS-3, which may be located locally in the requesting device 3-client-1, or it may be located in another of the client devices such as 3-client-3 or in one of the server devices 4-server-1, 4-server-2. In addition, a data set, such as 2-dat-3, may be required as an input for the execution of the service requested 3-service-3. The data set may be located in a data store such as 4-DS-1, which may be located locally in the requesting device 3-client-1, or it may be located in another of the devices such as server device 4-server-1.

Since data components such as 2-code-3, 2-dat-3, may be needed for the execution of service 3-service-3, it would make sense to try and execute 3-service-3 as close as possible to the data components, and preferably maybe even to execute 3-service-3 in one of the devices storing one or more of the data components. The abstraction interface 3-abs-int-1, in conjunction with the management component 110-sys-mng, could try to select the target device according to proximity to one or more of the data components. For example, if execution of 3-service-3 requires both 2-code-3 and 2-dat-3, then 3-abs-int-1, 110-sys-mng may decide to select 3-client-3 as the target device for executing 3-service-3, because 2-code-3 is already located in 3-DS-3 in 3-client-3, perhaps as a stored procedure, and therefore executing 3-service-3 in 3-client-3 would not require a transport of the code segment 2-code-3 to another location of execution, in which such transport could involve additional cost or latency in executing 3-service-3. Alternatively, 3-abs-int-1, 110-sys-mng may decide to select 4-server-1 as the target device for executing 3-service-3, because 2-dat-3 is already located in 4-DS-1 in 4-server-1, perhaps as a large database of some sort, and therefore executing 3-service-3 in 4-server-1 would not require a transport of the data set 2-dat-3 to another location of execution. If 2-dat-3 is larger than 2-code-3, then 4-server-1 could be the better selection, and 3-abs-int-1, 110-sys-mng would act accordingly by directing 3-dir-1 the request 3-req-3 to 4-server-1. Server device 4-server-1 would get the request 3-req-3 or a derivative thereof, and use the locally available data set 2-dat-3 to execute 3-service-3, together with code segment 2-code-3 that needs to be transported from 3-client-3 to 4-server-1. Such transport of code segment 2-code-3 could be directed by the management component 110-sys-mng, or by the server device 4-server-1 itself.

Although the selection of a target device for executing a requested service 3-service-3 may be affected by the location of various data components needed for executing 3-service-3, there are other criteria by which the system 110-sys may select target devices for executing requested services. For example, 3-client-3 may be a peer device such as a personal computer, belongings to a peer device layer associated with 110-tier-1, and therefore 3-abs-int-1, 110-sys-mng may prefer to execute 3-service-3 in 3-client-3 and not in 4-server-1 or 4-server-2 that may belong to a pay-for-usage layer associated with 110-tier-2. In that case, the request 3-req-3 will be directed to 3-client-3, and not to 4-server-1 or 4-server-2, in which execution of 3-service-3 by 3-client-3 is free of charge. In another example, 3-service-3 may be too complex to be executed on a device belonging to 110-tier-1, and therefore 3-abs-int-1, 110-sys-mng may decide to execute 3-service-3 on one of the devices of 110-tier-2, such as 4-server-1. In addition, 4-server-1 may also be equipped with special hardware, such as a DSP cluster, that may be critical for the efficient execution of 3-service-3. In a different exemplary scenario, 3-service-3 may be very simple, so 3-abs-int-1, 110-sys-mng may decide to execute it locally, in the requesting device 3-client-1 itself, in order to minimize latency. In such a case, the request will be directed 3-dir-3 back to the requesting device 3-device-1. However, in yet another example, although 3-service-3 may be very simple, the device 3-device-1 may be a smartphone with a low battery condition, and therefore 3-abs-int-1, 110-sys-mng may decide to direct the request 3-req-3 to another device. Other criteria may exist, such as communication bandwidth conditions, and moreover, a combination of different criteria may be factored algorithmically by the system 110-sys.

The device requesting a service may also be a server device, such as 4-server-2, sending 3-in-4, from an application 4-app, a request 3-in-4 to execute service 3-service-4. The request 3-in-4 is handled by the respective abstraction interface 3-abs-int-4, which decides, in conjunction with the management component 110-sys-mng, how to direct the request 3-req-4. The request could be directed 3-dir-5 according to a first criterion to another server 4-server-1 for execution, or it could even be directed 3-dir-4 according to another criterion to a client device such as 3-client-2 for execution.

One embodiment is a system 110-sys operative to migrate execution of services across multiple tiers. The system includes a plurality of client devices 3-client-1, 3-client-2, 3-client-3 constituting a first tier 110-tier-1, in which each of the client devices is associated with an abstraction interface 3-abs-int-1, 3-abs-int-2, 3-abs-int-3. The system further includes at least one server device 4-server-1, 4-server-2 communicatively connected with the client devices 3-client-1, 3-client-2, 3-client-3, in which said at least one server device constitutes a second tier 110-tier-2. The system further includes a management component 110-sys-mng associated with the abstraction interfaces 3-abs-int-1, 3-abs-int-2, 3-abs-int-3.

In one embodiment, each of the client devices (e.g., 3-client-1) is configured to send 3-in-3 a request 3-req-3, via the respective abstraction interface 3-abs-int-1, to execute a service 3-service-3 needed by the client device 3-client-1. The respective abstraction interface 3-abs-int-1 is configured to receive the request 3-req-3 and select, in conjunction with the management component 110-sys-mng and according to at least one criterion, which of the tiers 110-tier-1, 110-tier-2 is to handle the request 3-req-3 using which device (3-client-1, 3-client-2, 3-client-3 in 110-tier-1, or 4-server-1, 4-server-2 in 110-tier-2) in the tier. The system 110-sys is configured to direct (3-dir-1, or 3-dir-2, or 3-dir-3) the request 3-req-3 to the device selected (e.g., 3-dir-1 in case 4-server-1 is selected, 3-dir-2 in case 3-client-3 is selected, and 3-dir-3 in case 3-client-is selected,). The device selected (e.g., 4-server-1 in the case of 3-dir-1) is configured the receive the request 3-req-3 and execute the service 3-service-3 @ 4-server-1 accordingly.

In one embodiment, the at least one server device (e.g., 4-server-1) is the device selected, and said direction 3-dir-1 of the request 3-req-3 comprises directing the request into the server device. In one embodiment, the at least one criterion is associated with a complexity of the service 3-service-3 requested, in which said selection of the server device 4-server-1 is associated with an ability of the server device to execute complex services. In one embodiment, the at least one criterion is associated with a power consumption of the client device 3-client-1 making the request 3-req-3, in which said selection of the server device 4-server-1 is associated with a decision to preserve power in the client device making the request.

In one embodiment, one of the client devices (e.g., 3-client-3 or 3-client-1) is the device selected, and said direction of the request 3-req-3 comprises directing the request into the client device selected. In one embodiment, the client device selected (e.g., 3-client-3) is not the client device that has made the request 3-req-3. In one embodiment, the client device selected (e.g., 3-client-1) is the same client device 3-client-1 that has made the request 3-req-3.

In one embodiment, the at least one criterion is associated with a communication bandwidth limitation of the client device 3-client-1 making the request 3-req-3, in which said selection is associated with a decision to preserve communication bandwidth in the client device making the request.

In one embodiment, the at least one criterion is related to a latency requirement associated with the service requested 3-service-3, in which said selection is associated with a decision to reduce a latency associated with transporting the request 3-req-3.

In one embodiment, the at least one criterion is associated with a load-related condition in the server device (e.g., 4-server-1), in which said selection of one of the client devices 3-client-3, 3-client-1 is associated with the load-related condition detected in the server device.

In one embodiment, the at least one criterion is a cost criterion, in which said selection of one of the client devices 3-client-3, 3-client-1 is associated with lower cost of executing the service in one of the client devices as opposed to a higher cost of executing the service in one of the server devices.

In one embodiment, said at least one criterion is associated with at least one of: (i) a complexity associated with the service 3-service-3 requested, (ii) a communication bandwidth associated with the client device 3-client-1 making the request 3-req-3, (iii) a power consumption limitation associated with the client device 3-client-1 making the request 3-req-3, (iv) a latency requirement associated with the service 3-service-3 requested, (v) a cost criterion, in which the selection is operative to reduce a cost associated with executing the service 3-service-3, (vi) a proximity of a code segment 2-code-3 to the device selected, in which the code segment is required for the execution of the service 3-service-3, (vii) a proximity of a data set 2-dat-3 to the device selected, in which the data set is required as an input for the service 3-service-3, (vii) a load condition at the target device selected, in which the request is not directed to target devices that are overloaded, and (viii) a type of the target device selected, in which the target device selected is of the type optimized to execute a certain category of services.

In one embodiment, the service 3-service-3 requested in a microservice, and the system 110-sys constitutes at least a part of a system implementing a microservice architecture.

In one embodiment, the request 3-req-3 is associated with a remote procedure call (RPC).

In one embodiment, at least one of the client devices 3-client-1 is a mobile wireless device such as a smartphone, a tablet, a car, or an internet-of-things (IoT) device. In one embodiment, the mobile wireless device 3-client-1 executes a mobile application, in which the mobile application is the one initiating the request 3-req-3 for the service 3-service-3 which is needed by the mobile application.

In one embodiment, said selection is done according to a bid, in which the device selected is one of the devices associated with a better response to the bid, and in which the at least one criterion is associated with said response. In one embodiment, said better response is associated with a better latency offered, a better price offered, or a combination thereof in conjunction with said execution of the service 3-service-3.

On embodiment further comprises at least one data store 3-DS-3, 4-DS-1, in which at least one of said data stores (e.g., 3-DS-3) is operative to store a code segment 2-code-3 needed for said execution of the service 3-service-3, wherein said at least one criterion is associated with a proximity of the code segment 2-code-3 to the device selected, so as to minimize a cost, bandwidth, or latency associated with making the code segment available to the device selected. In one embodiment, the code segment 2-code-3 is stored in one of the data stores (e.g., 3-DS-3) that is located in the device selected (e.g., 3-client-3), in which the code segment 2-code-3 and the associated service 3-service-3 are a stored procedure in the device selected. In one embodiment, the code segment 2-code-3 is not stored in the device selected, and the system 110-sys is configured to transport the code segment from the respective data store (e.g., 3-DS-3) into the device selected.

One embodiment further comprises at least one data store 3-DS-3, 4-DS-1, in which at least one of said data stores (e.g., 4-DS-1) is operative to store a data set 2-dat-3 needed as input for said execution of the service 3-service-3, wherein said at least one criterion is associated with a proximity of the data set 2-dat-3 to the device selected (e.g., 4-server-1), so as to minimize a cost, bandwidth, or latency associated with making the data set available to the device selected. In one embodiment, the data set 2-dat-3 is stored in one of the data stores (e.g., 4-DS-1) that is located in the device selected. In one embodiment, the data set 2-dat-3 is not stored in the device selected, and the system 110-sys is configured to transport the data set from the respective data store (e.g., 4-DS-1) into the device selected.

In one embodiment, at least one of the client devices (e.g., 3-client-1) is a server computer, in which the request 3-req-3 for the service 3-service-3 is originated by an application 3-app running on the server computer.

Figure 4:
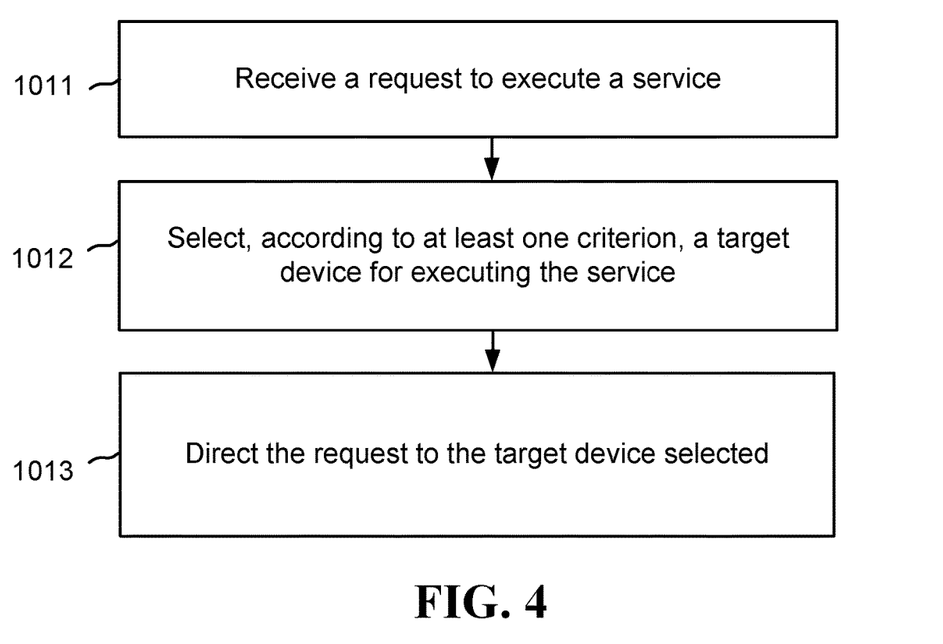
FIG. 4 illustrates one embodiment of a method for selecting targets for executing requested services.

FIG. 4 illustrates one embodiment of a method for selecting targets for executing services. The method includes: In step 1011, receiving (3-in-3 or 3-in-4), by an abstraction interface (3-abs-int-1 or 3-abs-int-4 respectively) associated with a first device (3-client-1 or 4-server-2 respectively), from an application program (3-app or 4-app respectively) running in the first device, a request (3-req-3 or 3-req-4 respectively) to execute a service (3-service-3 or 3-service-4 respectively) needed by the application program, in which said execution of the service requires a first data component 2-code-3, or 2-dat-3, or both. In step 1012, selecting, according to at least one criterion, by the abstraction interface (e.g., 3-abs-int-1), a target device (e.g., one of 3-client-1, 3-client-2, 3-client-3, 4-server-1, 4-server-2) for executing the service 3-service-3. In step 1013, directing (e.g., one of 3-dir-1, 3-dir-2, 3-dir-3) the request 3-req-3, by the abstraction interface, to the target device selected.

In one embodiment, said at least one criterion is associated with at least one of: (i) a complexity associated with the service 3-service-3, 3-service-4 requested, (ii) a communication bandwidth associated with the first device 3-client-1, 4-server-4 making the request 3-req-3, 3-req-4, (iii) a power consumption limitation associated with the first device 3-client-1, 4-server-2 making the request 3-req-3, 3-req-4, (iv) a latency requirement associated with the service 3-service-3, 3-service-4 requested, (v) a cost criterion, in which the selection is operative to reduce a cost associated with executing the service 3-service-3, 3-service-4, (vi) a proximity of the data component to the target device selected, (vii) a load condition at the target device selected, in which the request is not directed to target devices that are overloaded, and (viii) a type of the target device selected, in which the target device selected is of the type optimized to execute a certain category of services.

In one embodiment, said selection is done independently by the abstraction interface 3-abs-int-1, 3-abs-int-4.

In one embodiment, said selection is done by the abstraction interface 3-abs-int-1, 3-abs-int-4 in conjunction with a management component 110-sys-mng that is either in the first device 3-client-1, 4-server-2 or outside the first device. In one embodiment, said abstraction interface 3-abs-int-1, 3-abs-int-4 may be either in the first device 3-client-1, 4-server-2 or outside the first device. The abstraction interface may even be in one of the target devices, and in such a case, the target device is the one directing the request to another target device for execution.

One embodiment further comprises: instructing, by the abstraction interface 3-abs-int-1, 3-abs-int-4 or a management component 110-sys-mng associated therewith, a transport of the data component 2-code-3, or 2-dat-3, or both from a first data store in which the data component is stored, to a second data store located in a vicinity to the target device selected. For example, if the target device is selected to be 3-client-3, then 2-dat-3 is transported from 4-DS-1 to 3-DS-3. If the target device is selected to be 4-server-1, then 2-code-3 is transported from 3-DS-3 to 4-DS-1.

In one embodiment, the data component 2-code-3, or 2-dat-3, or both is either a code segment 2-code-3 needed for said execution of the service 3-service-3, or a data set 2-dat-3 required as an input for said execution of the service.

In one embodiment, said target device is selected from a group consisting of: (i) the first device itself, (ii) a server device, (iii) a mobile wireless device, and (iv) another device similar to the first device.

In one embodiment, said directing is transparent, so as to re-use the request 3-req-3, 3-req-4 itself. In one embodiment, said directing comprises modifying the request 3-req-3, 3-req-4 according to the target device selected, in which the request prior to said modification is inadequate or is incorrect to be sent in an original form to the target device selected.

In one embodiment, said first device is selected from a group consisting of: (i) a server device, (ii) a mobile wireless device, and (iii) another device similar to the target device.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed.

Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for on-demand isolated execution of specific tasks, comprising:
   receiving, via a communication interface, in a computing platform, a request to execute a specific task, in which the specific task is expressed as a first code segment comprising a plurality of commands;
   reacting, by the computing platform, to the request received, by allocating on-demand and per the request received, a sub-set of physical computational resources within the computing platform, in which said sub-set allocated is operative to facilitate successful execution of the specific task;
   executing, in the computing platform, the specific task, by (i) converting each of the commands into executable instructions and (ii) running the executable instructions, in which the commands are converted so as to cause the executable instructions to utilize resources within the allocated sub-set of physical computational resources, while avoiding utilization of other resources that were not allocated for the specific task, thereby facilitating said on-demand isolated execution of the specific task; and
   terminating said on-demand isolated execution immediately upon a particular event associated with the specific task, thereby releasing immediately the sub-set of physical computational resources for other tasks;
   wherein said particular event is selected from a group consisting of: (i) an ending or completion of the specific task, (ii) a timeout which limits the execution time of the specific task, (iii) a fault made by the specific task, and (iv) a supervision decision, by the computing platform, to terminate the specific task.

2. The method of claim 1, wherein the physical computational resources comprise physical memory, in which the sub-set of the physical computational resources comprise a sub-set of the physical memory.

3. The method of claim 2, wherein the code segment further comprises data sets, and the method further comprising:
   setting, using the data sets, in conjunction with said execution, memory values in conjunction with the sub-set of the physical memory.

4. The method of claim 1, wherein the conversion is an interpretation process, in which each of the commands is converted and executed separately from the other commands.

5. The method of claim 1, wherein the conversion is a compilation process.

6. The method of claim 1, wherein the conversion is a binary translation process.

7. The method of claim 1, wherein said causing of the executable instructions to utilize resources within the allocated sub-set is facilitated by generating, in conjunction with said conversion and prior to run time, specific access addresses to be utilized by the executable instructions, in which said specific access addresses are guaranteed, by the computing platform, to be contained within a set of addresses associated with the allocated sub-set.

8. A method for on-demand isolated execution of specific tasks, comprising:
   receiving, via a communication interface, in a computing platform, a request to execute a specific task, in which the specific task is expressed as a first code segment comprising a plurality of commands;
   reacting, by the computing platform, to the request received, by allocating on-demand and per the request received, a sub-set of physical computational resources within the computing platform, in which said sub-set allocated is operative to facilitate successful execution of the specific task; and
   executing, in the computing platform, the specific task, by (i) converting each of the commands into executable instructions and (ii) running the executable instructions, in which the commands are converted so as to cause the executable instructions to utilize resources within the allocated sub-set of physical computational resources, while avoiding utilization of other resources that were not allocated for the specific task, thereby facilitating said on-demand isolated execution of the specific task;
   wherein said specific task has a starting point and an ending point, and the method further comprises: initiating said execution in conjunction with said starting point; continuing said execution till the ending point; terminating said execution immediately after reaching the ending point; and releasing the sub-set of physical computational resources immediately after said termination and regardless of any state set by the specific task in conjunction with the sub-set of physical computational resources;
   wherein a transition between said reception and said execution takes less than 10 millisecond as a combined result of said conversion being an interpretation process and said allocation on-demand; and
   said transition together with said execution till the ending point and including said releasing takes less than 100

(one hundred) milliseconds as a combined result of said interpretation process, said allocation on-demand, and said specific task having said starting point and ending point.

9. A system operative to facilitate on-demand isolated execution of a plurality of tasks, comprising:
a set of physical computational resources;
at least one compute element belonging to at least one central-processing-unit; and
a communication interface;
wherein the system is configured to:
receive, via the communication interface, a plurality of requests to execute respectively a plurality of tasks, in which each of the plurality of tasks comprises a plurality of commands;
react, to each the requests received, by allocating on-demand and per the request received, a unique sub-set of the physical computational resources, so that a plurality of the unique sub-sets coexists at least temporarily in conjunction with the plurality of tasks respectively; and
execute, per each of the plurality of tasks, in a designated one of the compute elements, the respective commands of the task, by converting the respective commands of the task into executable instructions and running the executable instructions, in which the respective commands of the task are converted so as to cause the respective executable instruction to not access other unique sub-sets that were not allocated to the task, thereby facilitating said on-demand isolated execution of each of the plurality of tasks;
wherein the system is further configured to terminate the on-demand isolated execution of each of the tasks immediately upon a particular event associated with the task, thereby releasing immediately the respective unique sub-set of the task, thereby assuring that the respective unique sub-set of each of the tasks exist only for a duration in which the task is being executed and being terminated; and
wherein said duration of existence, on average, is between 1 (one) milliseconds and one (1) second; an average time for performing said allocation for each the unique sub-sets is less than 1/10 (one tenth) of said duration; and an average time for performing said releasing for each the unique sub-sets is less than 1/10 (one tenth) of said duration.

10. The system of claim 9, wherein:
said plurality of requests are received as a stream of incoming requests; and
said duration and average times allow, per each of the compute elements, to sustain, on average, a rate of executing of at least one of the tasks per second, and up to a maximum rate of executing of 1000 (one thousand) of the tasks per second.

11. The system of claim 10, wherein each of the requests is a remote-procedure-call (RPC).

12. The system of claim 9, wherein:
the system is a computing platform that communicates with remote nodes via said communication interface and a network;
the communication interface is a physical network adapter connected to the network; and
the requests are received in the system, from the remote nodes, via the network.

13. The system of claim 9, wherein:
the communication interface is a logical interface; and
at least some f the requests are generated from within the system and possibly by some of the tasks themselves.

14. The system of claim 9, wherein at least one of the requests is a remote-procedure-call (RPC).

15. The system of claim 14, wherein at least one of the tasks is configured to calculate at least one value, and to return the value as a respond to the respective remote node upon said termination of the task.

16. The system of claim 14, wherein at least one of the tasks is configured to receive a value via the respective request, and to use this value in conjunction with the respective execution of the respective commands.

17. The system of claim 9, wherein at least one of the requests is an internal system request associated with a system event that requires handling by one of the tasks.

18. The system of claim 9, wherein the set of physical computational resources comprises at least one of: (i) physical memory such as a random-access-memory (RAM) or a flash memory, in which each of the unique sub-sets is a unique subset of the physical memory, (ii) physical storage such as magnetic hard disks or flash disks, in which each of the unique sub-sets comprises a unique subset of the physical storage, and (iii) input-output (IO) channels, in which each of the unique sub-sets comprises a unique subset of the IO channels.

19. The system of claim 9, wherein the system is further configured to limit, per each of the tasks being executed, an extent to which the task is utilizing other system resource, in which said other system resource comprise at least one of: (i) the respective computer element clock cycles, (ii) communication bandwidth, and (iii) power dissipation.

20. The system of claim 9, wherein the set of physical computational resources is a physical memory such as a random-access-memory (RAM) or a flash memory, in which each of the unique sub-sets is a memory space of less than 1 MByte (one megabyte), thereby allowing for at least 1,000 (one thousand) of the tasks to be concurrently active per 1 Gbyte (one gigabyte) of the physical memory.

\* \* \* \* \*